United States Patent [19]

Pano

[11] Patent Number: 4,558,974
[45] Date of Patent: Dec. 17, 1985

[54] TOOL SYSTEM FOR PRECISION SLOTTING

[75] Inventor: Joseph Pano, Nahariya, Israel

[73] Assignee: Iscar Ltd., North Nahariya, Israel

[21] Appl. No.: 661,023

[22] Filed: Oct. 15, 1984

Related U.S. Application Data

[63] Continuation of Ser. No. 350,918, Feb. 22, 1982, abandoned.

[30] Foreign Application Priority Data

Mar. 3, 1981 [IL] Israel ........................................ 62278

[51] Int. Cl.[4] .............................................. B23P 15/34
[52] U.S. Cl. ........................................ 407/50; 407/72; 407/110; 407/117; 83/845
[58] Field of Search .................... 407/50, 72, 109, 110, 407/117; 83/839, 844, 845

[56] References Cited

U.S. PATENT DOCUMENTS

| 55,423 | 6/1866 | Lippincott | 83/845 |
|---|---|---|---|
| 174,216 | 2/1876 | Emerson | 83/845 |
| 883,076 | 3/1908 | Askins | 83/845 |
| 1,326,796 | 12/1919 | LeRoy et al. | 83/845 |
| 2,422,111 | 6/1947 | Lundberg | 83/844 |
| 2,994,350 | 8/1961 | Lundberg | 83/845 |
| 3,128,804 | 4/1964 | Scott | 407/115 |
| 3,780,408 | 12/1973 | McCreery | 407/117 |
| 3,785,021 | 1/1974 | Norgren | 407/117 |
| 3,894,322 | 7/1975 | Pano | 407/117 |

Primary Examiner—Leonidas Vlachos
Attorney, Agent, or Firm—Ladas & Parry

[57] ABSTRACT

Tool systems using replaceable cutting inserts and the insert for use in the systems wherein the tool holders have wedge shaped recesses for holding the inserts which are also wedge shaped and have shoulder means thereon that maintains the distance the cutting edge of the insert extends from the holder predetermined during operation of the system.

10 Claims, 14 Drawing Figures

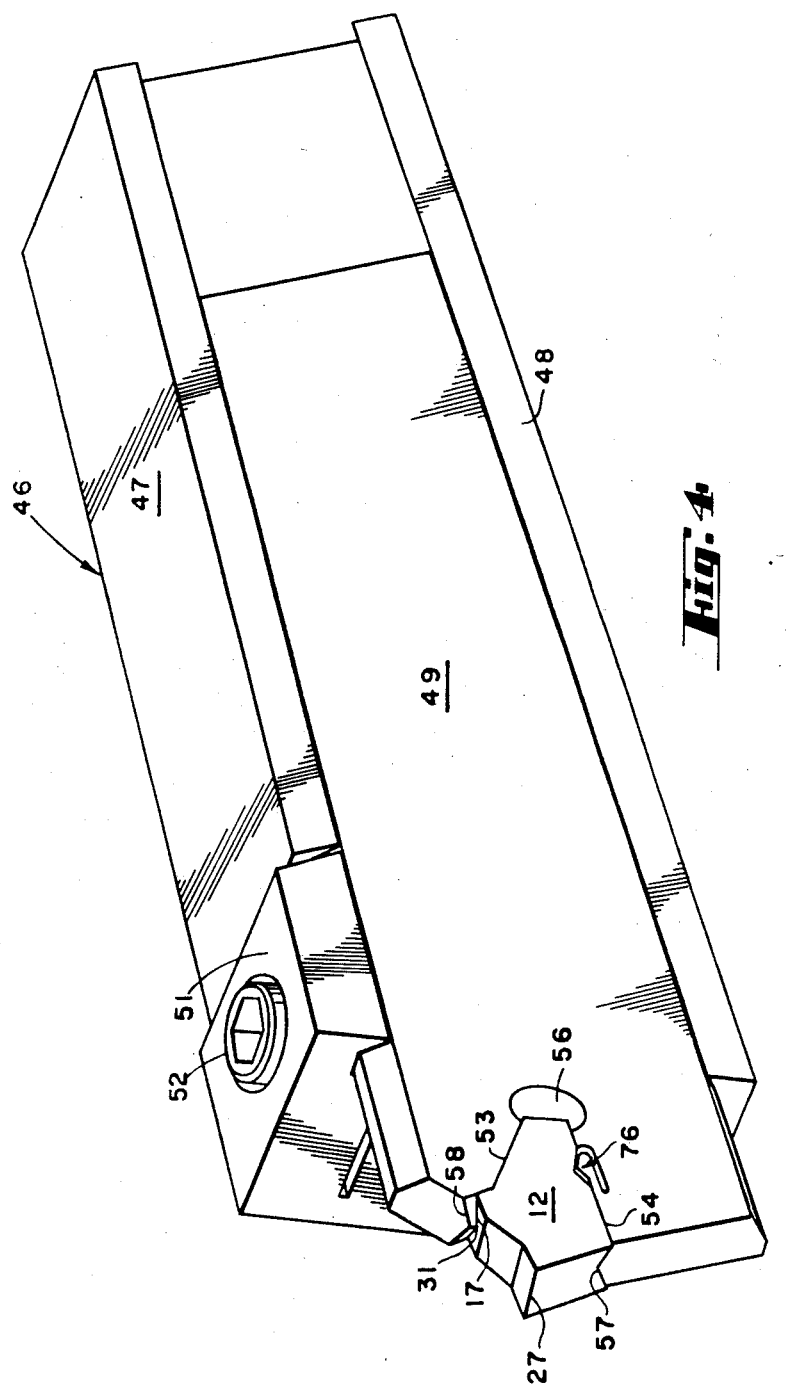

TOOL SYSTEM FOR PRECISION SLOTTING

This is a continuation of co-pending application Ser. No. 350,918 filed on Feb. 22, 1982 abandoned.

FIELD OF THE INVENTION

This invention relates to machine cutting tools for machining grooves and the like and more particularly to such machine cutting tools for use where it is necessary to maintain the accuracy of the depth of cut.

BACKGROUND OF THE INVENTION

Once the tool machine has been set up for a particular operation the accuracy of the depth of cut depends on maintaining a constant distance between the cutting edge and a fixed point on the tool holder. Where the cutting tool uses an insert special steps have been taken in the prior art to assure the accuracy and constancy of the depth of cut. The steps include forcing the cutting insert to abut the same surface on the cutting tool holder at all times. Clamp means of various kinds are used to hold the cutting tool insert against the abutting means.

The clamping arrangements, however, complicate the tools, take up valuable space, make the tooling more expensive and also add to the difficulties of using the inserts in the tools. Accordingly, in recent years tool insert systems have been provided which do not require clamping. Such tool insert systems, however, are not amenable to precision usage. The distance that the cutting inserts in such systems extend beyond the holders varies with characteristics, such as the feed rate and the material being cut.

The prior art inserts that are held without clamping means are held either by spring forces such as that shown in the system disclosed in U.S. Pat. No. 3,785,021 or the insert is held by the geometry of the insert in relation to the geometry of the holder. This type of self-gripping is shown in Belgian Pat. No. BE 853,475. It is also shown in Israel Patent Application No. 58862 in which there is a spring element which secures the insert from going out of the seat in addition to the wedge-like geometrical configurations that retain the insert in the tool holder.

When using spring forces for maintaining the insert in the holder without clamping means as disclosed in the U.S. patent, it is possible, theoretically, to maintain the distance that the insert extends beyond the holder constant. In practice, however, the spring element in the body of the holder which holds the cutting insert in place is the weak point of the tool. While working with the tool, the cutting forces negatively affect the stability of the clamping system such that it is not possible to make true precision cuts.

It is definitely not possible to make precision cuts with the prior art systems which use geometrical configuration for retaining purposes. More particularly the geometrical configuration in the prior art systems use recesses defined by jaws in the tool holder. The jaws are at a first angle and abut clamping surfaces on the inserts which are at slightly larger angles. Thus as the cutting forces act on the cutting insert during the cutting operation the insert is forced further into the jaws until equilibrium is reached and the insert is locked in place. However, since the equilibrium point can vary, it has not been possible to use such tools for precision work. Accordingly there is a long-felt need for cutting inserts that are maintained in the tool holders by the geometrical configurations and that can be used for precision work.

It is an object of the present invention to provide a new and improved precision groove cutting tool system in which the above-referred to disadvantages are substantially reduced or overcome.

SUMMARY OF THE INVENTION

According to the present invention a machine cutting tool system for use in precision work is provided; said system comprising:

a tool holder, recess means on said tool holder, said recess means having top and bottom jaws, said top jaw being disposed at an angle to said bottom jaw, cutting insert means received in said recess, said insert means having a top clamping surface, a bottom clamping surface on said insert being disposed at substantial said second angle to said top clamping surface, whereby when said insert is inserted into said recess with said top clamping surface juxtaposed to said bottom jaw, said insert is retained in place by forces of compression exerted by said jaws, and shoulder means for maintaining the distance said insert extends from the holder predetermined during operation of the system.

Another feature of the present invention is to provide inserts geometrically shaped to be gripped by tool holders without additional clamping means wherein the cutting insert includes shoulder means.

Yet another feature provides for the shoulder means to have a characterized surface into which the abutting surface of the holder meshes to maintain the stability of the cutting insert during the operation of the system. Not only is the stability maintained but it is reinforced by the meshing and characterized shapes of the holder and the cutting insert. Such characterized shape can for example be an extended V meshing into an inverted V.

Yet another feature of the present invention is to provide spring detent means as a safety factor to assure that the "self-grip" tool insert will not inadvertently come out of the holder. It should be noted that if such spring means are used, the configuration of the portion of the insert receiving the spring means is such that the spring means has no influence on the location of the insert.

Still another feature of the present invention is that the system is usable in stationary tools as well as in rotary tools.

The system retains the cutting insert located and held with sufficient stability to withstand the vibrations caused by the additional forces generated by means for controlling the form and the flow of the chips.

BRIEF DESCRIPTION OF THE DRAWINGS

The operation and utilization of the present invention will become more fully apparent from the description of the preferred embodiments taken in conjunction with the accompanying drawings, in which:

FIG. 4 is a stationary tool holder using the "self-grip" configuration having a shoulder equipped cutting insert;

GENERAL DESCRIPTION

Figure 1:
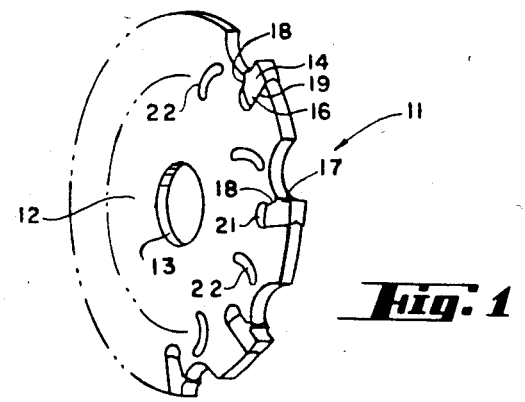
FIG. 1 is a pictorial showing of a rotary tool holder and self-gripping, shoulder equipped cutting inserts.

The cutting tool 11 shown in FIG. 1 includes a rotary tool holder 12 having a centrally disposed mounting aperture 13. Peripherally mounted are shown a plurality of cutting inserts such as insert 14. The cutting inserts are configured to be held in the holder in cooperation with the shape of the recess 16 without any clamping means. It is noted that the cutting insert 14 has a shoulder 17 which abuts against portion or top jaw 18 of the recess 16. Angularly disposed from top jaw 18 is a bottom jaw 19. At the rear of the recess 16, there is an aperture, such as aperture 21 for use in removing the inserts. Also shown are arcuate slots 22 forming a plurality of enclosed hollow recesses in said cutting tool 11.

Figure 2:
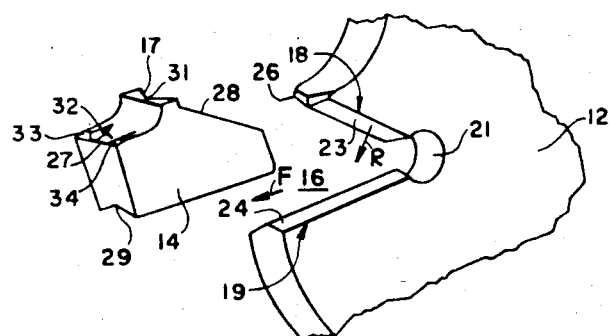
FIG. 2 is a portion of the rotary tool holder of FIG. 1 wherein one embodiment of the geometrical configuration of the interacting recess and cutting insert are shown.

In the partial view of FIG. 2 the recess 16 is shown as being defined by the jaws 18 and 19 which have clamping surfaces 23 and 24 respectively. The surfaces 23 and 24 are shown as having inverted V shapes. The front portion 26 of the top jaw 18 also has a characterized shape as shown as an inverted V shape with the apex extending outwardly. Surface 26 is the shoulder abutting surface of the holder.

The cutting insert 14 also is shown as including a cutting edge 27, a top clamping surface 28, a bottom clamping surface 29, and a holder abutting characterized surface 31. In this case it is a V shaped surface with the apex of the V jutting inwardly so that the shoulder 17 of insert 12 abuts with the shoulder abutting surface 26.

Similarly the top and bottom jaws abutting surfaces 28 and 29 are characterized to match the surfaces 23 and 24. Thus those surfaces also are V shaped with the apex of the V inclined inwardly.

The insert is also shown with means 31 for controlling the shape of the chips generated during the cutting operation. More particularly, upwardly protruding sections 33 and 34 are shown slightly removed from the cutting edge 27 and at the side boundaries of the top surface of the cutting insert.

Figure 3:
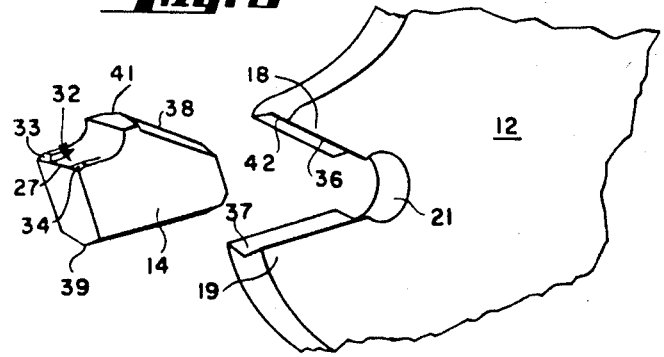
FIG. 3 is a pictorial showing of a portion of the rotary tool of FIG. 1 with yet another geometrical configuration shown.

In FIG. 3 the system is very similar to that shown in FIG. 2 with the exception that the surfaces 36 and 37 of the jaws are each shown as having the apex of the V inclined inwardly. The shoulder abutting surface 38 is also shown as an inverted V, that is a V with the apex inclined inwardly. The holder abutting surface 39 on the cutting insert 14 is an inverted V with the apex inclined outwardly.

Different shapes can be used at the abutting surfaces within the scope of the invention. The key thing is that the shapes conform one to the other and aid in stabilizing the insert. The shoulder also assures that the cutting depth is precise.

It should be understood that while FIGS. 1 to 3 are concerned with a rotary tool system, the system is just as effective in stationary tools. In FIG. 4 the stationary tool system 46 is shown. The system includes the tool machine shown only in part as 47 and 48 into which is clamped a tool holder 49 by clamp means 51 actuated by clamping screw 52, for example. One end of the tool holder includes a recess defined by top jaw 53 and bottom jaw 54. An aperture 56 is also included for use in removing a cutting insert such as insert 14. The abutting surfaces of the insert conform to the jaw surfaces of the tool holder 49. The insert 14 includes a shoulder 17 having a characterized shape shown as holder abutting surface 31 which matches with shoulder abutting surface 58 on the holder. The insert 14 is shown as having a cutting edge 27 and it is shown without any chip control means. It should be understood that the chip control means can also be used with the stationary tool system shown in FIG. 4.

Figure 5A:
FIGS. 5a, 6a and 7a show the respective chip cross-sectional configurations.
Figure 5:
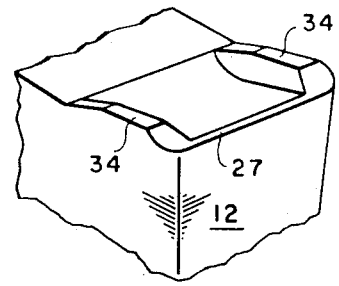
FIGS. 5, 6 and 7 show different chip control configurations that can be used with the inventive system.
Figure 6A:
Figure 6:
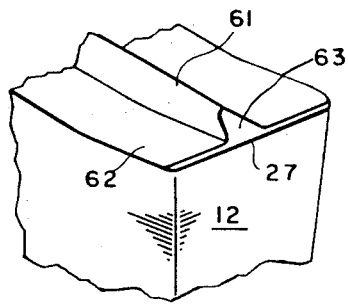
Figure 7A:
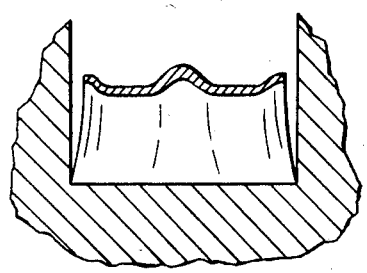
Figure 7:
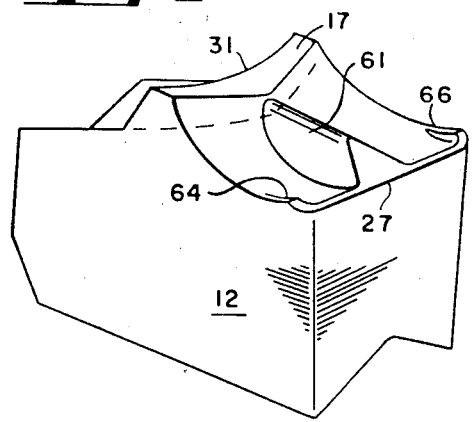

Within the confines of the present invention it is possible to use different chip control configurations. These different configurations are shown in FIGS. 5, 6 and 7. The shape of the chip determined by the respective configurations is shown in the three figures generally strengthen the chip by putting a stress on the chip and narrow the width of the chip. The narrower width is particularly pointed out in FIG. 7a which shows the chip within the groove being cut.

FIG. 5 is very similar to the showing of the inserts of FIGS. 2 and 3 where there are a pair of protrusions 33 and 34 spaced apart from each other on both sides of the cutting surface of the insert 14. The cutting edge 27 is slightly in front of the protrusions. This assures that the protrusions which are spaced back from the cutting edge control the chip shape after the cuts but while the chip is still hot and malleable.

In FIG. 6 the insert cutting edge 27 has a chip control protrusion 61 which is slightly removed by space 63 from the cutting edge. It is located approximately in the middle of the top surface 62 of the cutting insert 14. The configuration of FIG. 6 generates a spine down to the middle of the chip and thereby rigidizes the chip and also decreases the width of the chip.

The showing of the cutting insert 14 in FIG. 7 also shows a shoulder 17 such as shown in FIG. 2. Therein the shoulder 17 is shown as having a characterized holder abutting surface 31 which is V shaped having the apex on the inward side of the V. The chip control configuration includes a protruding central rib 61 and two small side protrusions 64 and 66. The protrusions are also all three slightly removed from the cutting edge 27.

Figure 8A:
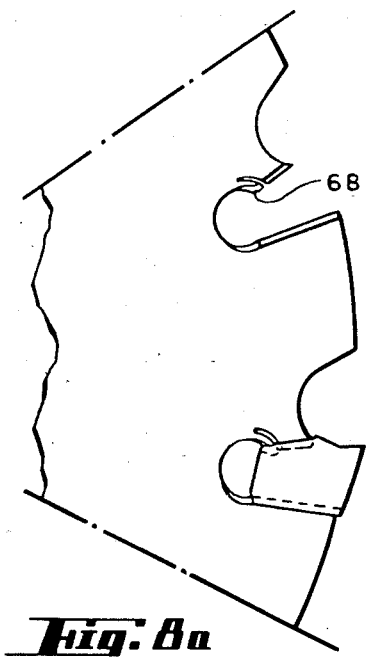
FIGS. 8a, 8b and 9a, 9b show the use of spring-like detents in the recesses of the rotary tool holder and respectively a matching groove in the shoulder equipped insert for receiving the detent.
Figure 9A:
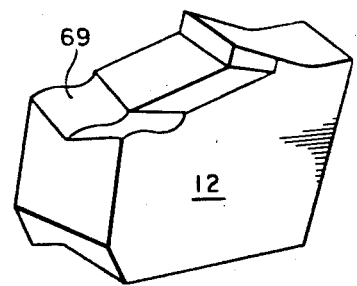
Figure 8B:
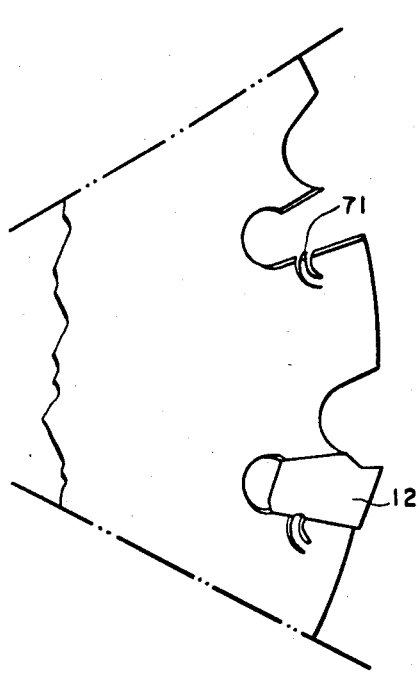
Figure 9B:
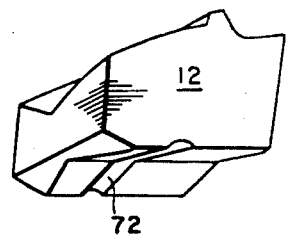

Means are provided for assuring that even under the worst conditions the insert 14 is not inadvertently removed from between the jaws. More particularly a spring detent 68 shown in FIG. 8a fits into a groove such as groove 69 in insert 14 shown in FIG. 9a. The detent extends in FIG. 8a from the top jaw surface. Similarly a detent 71 is shown extending from the bottom jaw surface of a rotary holder. The groove 72 in FIG. 9b receives the detent. It should be understood that while FIGS. 8a and 8b show a rotary tool holder the same principle is applied to the stationary tool holder and as a matter of fact the detent and groove arrangement are shown at 76 in FIG. 4.

The shape of the groove and the meshing spring detent are such that the detent groove arrangement has no bearing on the location of the insert. When the insert is being forced out, the detent and the groove cooperate to resist the removal of the insert.

The tool system provided assures that the insert will only go into the recess defined by the jaws up to the shoulder. This maintains the spacing between the cutting edge and the holder constant and thus enables precision machining with a "self-gripping" type insert. The insert is placed into the recess in either a rotary tool or a straight tool holder and the machining forces push the insert into the recess until the shoulder abuts the holder. The angle of the recess is generally smaller than used in holders for inserts without shoulders. It is retained and maintained in a stable position and the geometrical configuration is such that the shoulder abuts the holder without undue stresses being placed on the holder by the wedge-shape of the insert even when the tolerances of the system are at their extremes.

Up to this present system, tool engineers have refrained from using shoulders on "self-grip" tool holder systems. The shoulders are after all contrary to the logic of such systems. "Self-grip" or "wedge shaped" tool holder systems depend on an equilibrium of forces for retaining the tool insert in the recess of the holder without fracturing the holder. The force P resulting from the action of the cutting surface and the work piece must be at least equal to the sum of: (1) the vector force R resulting from the resilient forces acting normal to the clamping surfaces of the insert tending to force the insert out of the recess and (2) the friction force F between the clamping surfaces and the jaw-resisting movement of the insert. The force R increases as the insert is forced deeper into the recess and therefore at some point before fracture of the tool holder the forces must reach equilibrium so that the cutting can be accomplished.

The forces R and F are both trigonometrical functions of the wedge angle (sine and tangent respectively). It is known that a smaller wedge angle gives more effective grip by the jaws. The smaller angle however, also increases the strain tending to fracture the holder about the recess. Thus too small an angle can result in fracturing the holder. Also the smaller angle enables further longitudinal movement of the insert in the recess.

It was thought that a shoulder on the insert would tend to prevent the insert from being forced into a holder to the equilibrium point or else the equilibrium point would be reached prior to the shoulder abutting the holder. In either case the shoulder, it was thought, would not enable precision work. Thus shoulders have not been used in the prior art and the problem of using "self-grip" systems for precision work remained.

The problem is solved in the present system by using smaller wedge angles (6°-12° on this system compared to 8°-15° on the prior systems) which enables smaller forces to move the insert into the holder up to the shoulder. At the same time the shoulder prevents the insert from being driven into the recess far enough to fracture the holder.

The system is designed to take into account the tolerances so that at the minimum height of the insert the friction force F is sufficient to at least equal the force R to hold the insert in its place. Also at the maximum size of the insert and minimum size of the recess the angle is such that the insert does not exert a fracturing force on the holder. The force P is countered by the shoulder. Thus the system insures that the insert is self gripped, the shoulder abuts the holder, and the system can be used for precision slotting.

Another advantage provided by the system is that the cutting edge of the insert can be aligned with the top surface or upper face of the holder. Thus the possibility of collision between the chip and the holder is practically non-existent.

While the principles of the invention have been described above in connection with specific apparatus and applications, it is to be understood that this description is made by way of example only and not as a limitation on the scope of the invention.

I claim:

1. An improved cutting tool assembly comprising:
   a tool holder having a pair of rigid gripping jaws formed integrally as one piece in an edge portion of said tool holder; a pair of longitudinally directed jaw edges which are directed to an acute angle of between 6° to 12° to each other and which define between them an open-ended, wedge-shaped recess of said holder which opens out towards the edge of the tool holder; a unitary cutting insert having a pair of longitudinally directed insert edges which are directed at an acute angle of between 60° to 12° to each other and which define between them a wedge shaped body portion of said insert; a leading end of said insert formed adjacent a wider end of said body portion and having formed thereon a cutting edge; an opposite rear end of said insert formed adjacent a narrower end of said body portion; wherein the improvement comprises:
   an abutment shoulder formed on an adjacent to one end of said insert edges; said insert being insertable into said recess and being frictionally retainable between said jaws with with said abutment shoulder abutting the exposed end of one of said jaws so as to limit the extent of insertion of said insert into said recess, said rear end of said insert being fully spaced from a narrow end of said recess, and chip shaping means formed on said cutting insert for controlling the shape and rigidity of the chips being formed during an operation of the assembly.

2. The cutting tool assembly of claim 1 wherein said tool holder is a rotary tool holder.

3. The cutting tool assembly of claim 1 wherein said tool holder is a stationary tool holder.

4. The cutting tool assembly of claim 1 wherein means are provided for assuring that said insert is not inadvertently removed from said recess.

5. The cutting tool assembly of claim 4 wherein groove means are provided in said cutting insert and spring detent means are located in said recess and are received in said groove means.

6. The assembly of claim 1, wherein said cutting insert has top cutting surface means including said chip shaping means,
   clearance side means extending from said top cutting surface means,
   cutting edge means formed at the junctures of said top cutting surface means and said clearance side means,
   land surface means between said cutting edge means and said chip shaping means, and
   said chip shaping means comprising rib means on said top cutting surface means extending from said land surface means longitudinally away from said cutting edge means.

7. The assembly of claim 6 wherein said rib means comprises a pair of oppositely disposed spaced apart ribs.

8. The assembly of claim 6 wherein said rib means comprises single rib means between opposite sides of said top cutting surface means.

9. The assembly of claim 6 wherein said rib means comprises a pair of oppositely disposed spaced apart ribs, and a central rib between said side ribs.

10. The assembly of claim 3 wherein said shoulder and recess are adapted to maintain the cutting edge of the insert aligned with the top surface of said holder.

* * * * *

UNITED STATES PATENT AND TRADEMARK OFFICE
CERTIFICATE OF CORRECTION

PATENT NO. : 4,558,974
DATED : December 17, 1985
INVENTOR(S) : Joseph Pano

It is certified that error appears in the above-identified patent and that said Letters Patent is hereby corrected as shown below:

Claim 1, line 11, after "between" change "60°" to --6°--;

line 19, after "on" insert --,--, before "adjacent" change "an" to --and--;

line 22, change "jaws with with" to read --jaws with--.

Signed and Sealed this

Eighteenth Day of November, 1986

*Attest:*

DONALD J. QUIGG

*Attesting Officer*     *Commissioner of Patents and Trademarks*